United States Patent [19]
Baxi et al.

[11] Patent Number: 5,096,655
[45] Date of Patent: Mar. 17, 1992

[54] METHOD FOR INJECTION MOLDING

[75] Inventors: Indra R. Baxi, Solon; Thomas W. Johnson, Middlefield, both of Ohio

[73] Assignee: Nitrojection Corporation, Middlefield, Ohio

[21] Appl. No.: 527,065

[22] Filed: May 21, 1990

Related U.S. Application Data

[63] Continuation-in-part of Ser. No. 493,909, Mar. 14, 1990, Pat. No. 5,049,056.

[51] Int. Cl.⁵ .................... B29C 45/34; B29C 45/72; B29D 22/00
[52] U.S. Cl. .......................... 264/572; 55/97; 264/328.8; 264/328.13; 264/328.14; 425/812
[58] Field of Search .............. 264/85, 237, 328.8, 264/328.12, 328.13, 328.14, 528, 572; 425/812; 55/97

[56] References Cited

U.S. PATENT DOCUMENTS

| | | | |
|---|---|---|---|
| 4,140,672 | 2/1979 | Kataoka | 264/45.1 |
| 4,830,812 | 5/1989 | Kauer | 264/572 |
| 4,942,006 | 7/1990 | Loren | 264/85 X |

FOREIGN PATENT DOCUMENTS

| | | | |
|---|---|---|---|
| 2109633 | 9/1972 | Fed. Rep. of Germany | 264/572 |
| 2256021 | 7/1975 | France . | |

*Primary Examiner*—Leo B. Tentoni
*Attorney, Agent, or Firm*—Fay, Sharpe, Beall, Fagan, Minnich & McKee

[57] ABSTRACT

A process for producing an injection molded product includes the step of introducing an amount of a molten thermoplastic sufficient for the preparation of the injection molded product into a mold cavity. A quantity of heated gas is introduced into the mold cavity, the molten thermoplastic in the mold cavity thereby forming a gas cavity in the molten thermoplastic. The heated gas is then vented from the gas cavity and a cooling gas is introduced into the gas cavity. The injection molded product is cooled and then the cooling gas is vented from the gas cavity.

23 Claims, 4 Drawing Sheets

METHOD FOR INJECTION MOLDING

This application is a continuation-in-part of Ser. No. 07/493,909, filed Mar. 14, 1990, now U.S. Pat. No. 5,049,056.

BACKGROUND OF THE INVENTION

This invention generally pertains to methods of injection molding. More specifically, the present invention relates to a method for injection molding which employs fluids of different viscosities.

The invention is particularly applicable to a method by which a relatively viscous fluid, such as a molten thermoplastic, is molded into a particular product with the aid of a relatively non-viscous fluid, such as a gas, during an injection molding process known as gas assisted injection molding. However, it will be appreciated to those skilled in the art that the invention has broader applications and may also be adapted for use in other injection molding environments where both a relatively viscous fluid, such as a plastic or wax, and a relatively non-viscous fluid, such as a gas, steam or a liquid, are injected into a mold cavity.

Gas assisted injection molding processes are becoming widely known in the art. Such processes employ the step of injecting a plasticized (melted) thermoplastic material under high pressure, in the range of 2,000 p.s.i. injection pressure, into a finite mold space to a volume less than 100% of the mold space. Either simultaneously therewith or shortly thereafter a relatively non-viscous fluid such as an inert gas, is injected into the plasticized material in order to fill the remainder of the volume in the mold cavity. The gas which enters the plasticized material moves along the paths of least resistance therein. Such paths are normally in areas where the thermoplastic body is the thickest and has slower cooling sections. In this way, with a suitably designed part, one or more hollowed out sections can be provided in the part. The material is displaced by the gas from the middle of these sections and moves out to fill the remainder of the mold space. In this way, the plastic material remains held against the mold surfaces during hardening and sink takes place internally, rather than on the exterior surfaces of the part. Since the pressure used for final filling of the part is confined to an area defined by the gas channel or cavity, the resultant force against the sections of the mold is relatively modest so that lower clamping forces on the mold are adequate.

The added equipment and process control mechanisms necessary to implement gas assisted injection molding contributes significantly to the cost and complexity of this type of molding process. The circuits needed to charge, inject and vent the pressurized gas at specific times and at desired pressures are quite complex and the methods for utilizing such apparatus have not at this point been optimized. Another problem with conventional injection molding processes in general is the venting of the gas from the gas cavity formed in the molded part. A further problem is that the time required to cool the molded product is substantial in relation to the time that the injection molding process itself takes. Thus, producing a quantity of such products is a time-consuming process.

Accordingly, it has been considered desirable to develop a new and improved injection molding process which would overcome the foregoing difficulties and others while providing better and more advantageous overall results.

BRIEF SUMMARY OF THE INVENTION

In accordance with the present invention, a new and improved process for producing an injection molded product is provided.

More particularly in accordance with this aspect of the invention, the process comprises introducing an amount of a molten thermoplastic material sufficient for the preparation of the injection molded product into a mold cavity. A quantity of heated fluid is introduced into the molten thermoplastic in the mold cavity thereby forming a fluid cavity in the molten thermoplastic. The heated fluid is then vented from the fluid cavity and a cooling fluid is introduced into the fluid cavity. The injection molded product is thereupon cooled and the cooling fluid is subsequently vented from the fluid cavity.

In accordance with another aspect of the invention, a process is provided for producing an injection molded product.

More particularly in accordance with this aspect of the invention, the process comprises the step of introducing a stream of a molten thermoplastic material at a first, injection, pressure into a mold cavity and introducing a heated gas at a second pressure which is at least as high as the first pressure into the molten stream of thermoplastic material. A gas cavity is thereby formed in the thermoplastic material. The heated gas is vented from the gas cavity and a cooling gas is introduced into the gas cavity. The cooling gas is held at a third pressure which is higher than the second pressure. The injection molded product is cooled and the cooling gas is then vented from the gas cavity.

In accordance with still another aspect of the invention, a process for fluid assisted injection molding for producing an injection molded product is provided.

More particularly in accordance with this aspect of the invention, the process comprises the step of introducing a molten stream of a thermoplastic material at a first, injection, pressure into a mold cavity. A heated gas is then introduced at a second pressure into the molten stream of thermoplastic material thereby forming a gas cavity in the thermoplastic material. The second pressure is at least as high as the first pressure. The heated gas is thereupon vented from the gas cavity and a cooling gas is circulated through the gas cavity. The injection molded product is cooled and it is subsequently removed from the mold cavity.

One advantage of the present invention is the provision of a new and improved method for fluid assisted injection molding.

Another advantage of the present invention is the provision of a process for fluid assisted injection molding which is faster than the heretofore known processes of this type.

Still another advantage of the present invention is the provision of a fluid assisted injection molding process in which a cooling fluid is circulated through a fluid cavity formed in the thermoplastic material.

Yet another advantage of the present invention is the provision of a process for producing an injection molded product which employs the step of filtering the fluid during its venting from the fluid cavity.

A further advantage of the present invention is the provision of a fluid assisted injection molding process in which different paths are utilized for introducing the fluid and for venting the fluid.

A still further advantage of the present invention is the provision of a fluid assisted injection molding process in which the fluid to be injected is heated so that it approaches the temperature at which the molten thermoplastic enters the mold cavity.

A yet further advantage of the present invention is the provision of a fluid assisted injection molding process in which different paths are utilized for introducing and venting a cooling fluid than are utilized for introducing and venting the heated fluid.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 6 is a side elevational view in cross section of an injection molding nozzle according to a third preferred embodiment of the invention which can be utilized in the apparatus illustrated in FIG. 4; and, FIG. 7 is an enlarged side elevational view in cross section of a portion of the nozzle of FIG. 6.

DETAILED DESCRIPTION OF PREFERRED AND ALTERNATE EMBODIMENTS

Figures 1, 2, 3:
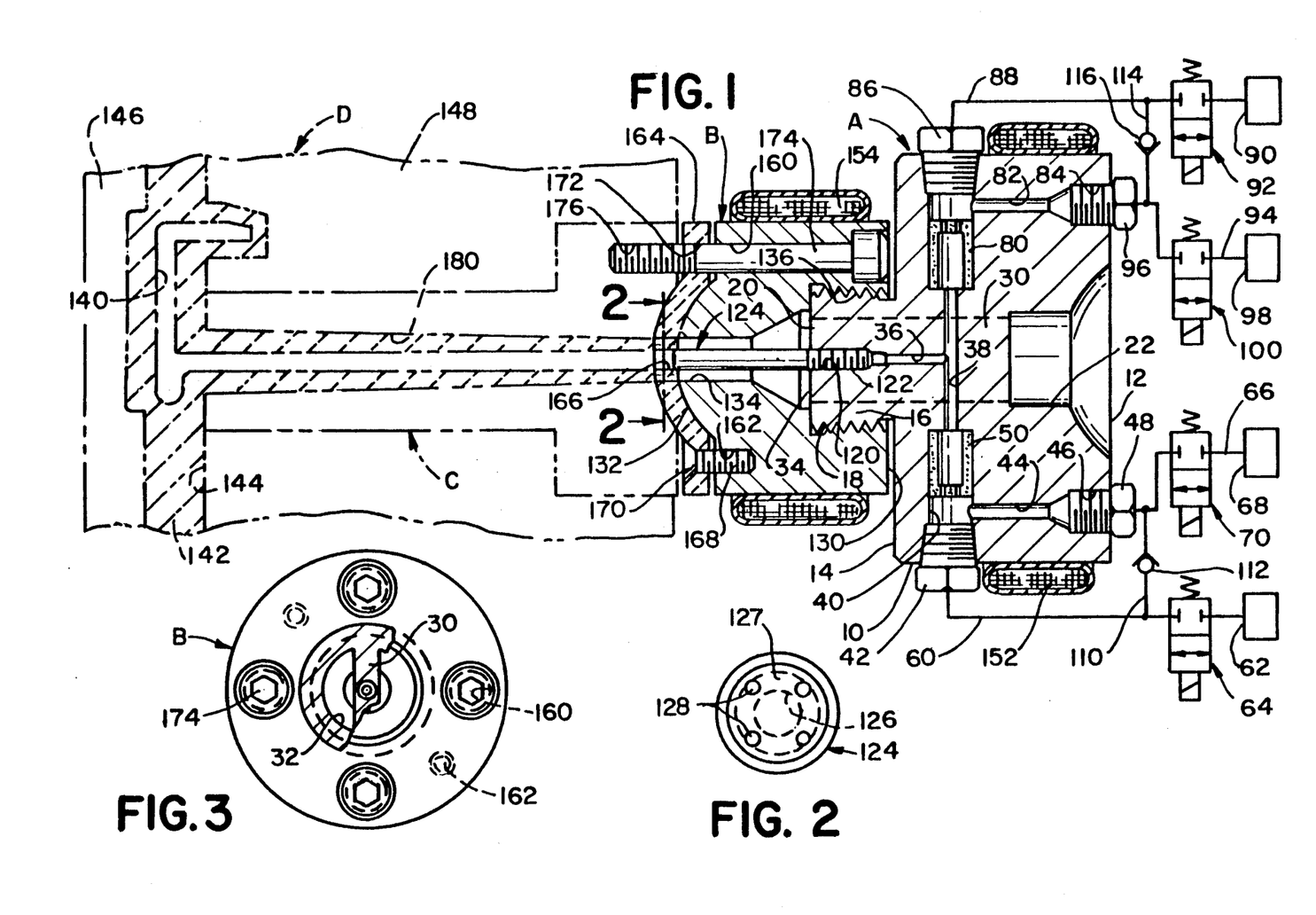
FIG. 1 is a side elevational view in cross section of an adaptor body and an insert body together with associated apparatus utilized in the process according to the first preferred embodiment of the present invention.
FIG. 2 is a greatly enlarged front elevational view of an extension tube secured at one end to the adaptor body of FIG. 1 along line 2—2.
FIG. 3 is a partially broken away front elevational view of the adaptor body and insert body of FIG. 1.

Referring now to the drawings, wherein the showings are for purposes of illustrating preferred embodiments of the invention only and not for purposes of limiting same, FIG. 1 shows the subject new bushing, including an adaptor body A and, preferably, an insert body B, which is utilized in the process for fluid assisted injection molding according to the present invention. It should, however, be recognized that the adaptor body can be utilized by itself in the method according to the present invention and that the adaptor body can have many different configurations.

The adaptor body A is substantially cylindrical in cross-section in the embodiment shown, although it could also have any other conventional cross sectional shape as well. The body has a larger diameter first section 10 on which is defined a first or rear end 12 and a second or front end 14. Mounted on the front end is a reduced diameter second section 16. Provided on an exterior periphery of the second section 16 is a threaded area 18. The adaptor body A also includes a smooth outer periphery on the first section 10 thereof.

Extending longitudinally through the adaptor body A, substantially along its center line, from the first section rear end 10 to a second section front end 20 is a bore 22. The bore accommodates a flow of a relatively viscous fluid, such as a molten thermoplastic, through the body.

Extending transversely across the bore 22 between opposing walls of the bore and adjacent the adaptor body front end 20 is a bridge 30. Fluid flow is allowed through the first bore around the bridge through semi-circular slots 32 of the bore 22 as is evident from FIG. 2. The bridge 30 has a substantially flat front end 34. Extending into the bridge 30 from the front surface 34 thereof is a first bore 36 for accommodating a flow of a relatively non-viscous fluid. This fluid can be a neutral gas such as nitrogen, but it could also be air, steam or the like. The first bore 36 terminates on the bridge front surface in such a manner as to be substantially coaxial with the adaptor body longitudinal bore, as best seen in FIG. 2.

The first bore 36 communicates with a second bore 38 extending approximately normal to the first bore in the adaptor body A. A third bore 40 of substantially larger diameter than the second bore communicates therewith and extends to the outer periphery of the adaptor body first section 10. The third bore includes a threaded section adjacent the adaptor body outer periphery 20 so as to accommodate a suitably threaded fitting 42. Communicating with the third bore 40 is a fourth bore 44 defined in the adaptor body A in a direction normal to the third bore. The fourth bore 44 in turn communicates with a fifth larger diameter bore 46 that extends through the rear end 10 of the adaptor body A. Suitably threaded in the fifth bore 46 is a second fitting 48.

Located in the adaptor body third bore section 40 is a suitably designed, cylindrically shaped filter 50 made of a suitable, conventional material for filtering the gas or other relatively non-viscous fluid flowing through the bores 36, 38, 40, 44 and 46. The filter is especially useful during the decompression of fluid which is held in the fluid cavity formed in the molded part during the molding operation. The filter prevents the flow back into the fluid line of plastic particles which "dust off" the now solidified plastic part when the fluid is vented from the fluid cavity created in the molded part. Thus, the main function of the filter 50 is to filter the fluid flowing back out of the mold cavity in order to prevent thermoplastic particles from flowing back into the fluid line and eventually clogging the line or a valve positioned in the line.

A first fluid line 60 communicates with the fitting 42 and hence with the plurality of bores. The line 60 leads from a first fluid supply source 62 with the flow of fluid being controlled by a suitable conventional first valve 64. Also provided is a second fluid line 66 which communicates with the fitting 48 and allows fluid to flow from a pressurized second fluid source 68 as controlled and regulated by a second valve 70.

Preferably, the third bore 38 extends away from the second bore 36 in both directions so as to also communicate with sixth, seventh and eighth bores, 80, 82 and 84 provided in the adaptor body A. In this way, two paths are provided for the fluid to flow through the adaptor body A. A third fitting 86 communicates fluid from a third line 88 with the sprue bushing A. The third line leads to a third pressurized fluid source 90 and is regulated by a third valve 92 positioned in the line 88. Also provided is a fourth fluid line 94 which communicates with a fitting 96 that is secured to the adaptor body A in the line 84. The fourth line 94 allows pressurized fluid from a fourth supply source 98 to communicate with the fitting 96 as controlled by fourth valve 100.

If desired, a fifth fluid line 110 can be provided between the first and second fluid lines 60 and 66 with a one way check valve 112 being positioned in that line to prevent communication between the fluid lines in one direction. Similarly, a sixth fluid line 114 can be provided to allow selective communication between the third and fourth fluid lines 88 and 94 and a check valve 116 can be provided in that line to allow communication only in one direction.

Provided on the adaptor body first bore 36 is a threaded area 120 which cooperates with a suitable threaded section 122 of a tube 124 that is secured to the adaptor body A. The tube 124 extends away from the adaptor body A and includes a longitudinally extending through bore 126 (FIG. 2) which communicates with the first bore 36. In this way, gas will flow out of the first bore 36 and into the tube through bore 126.

As shown in FIG. 2, the through bore 126 can, if desired, be sealed with a suitable plug 127 such that the plug is provided with a plurality of spaced small sized apertures 128, as shown in FIG. 2. This would be advantageous to prevent the inflow of molten thermoplastic material during the depressurization. The small size apertures make it difficult for the molten thermoplastic material to flow back through them and into the larger diameter bore 126 in the tube 124.

With continuing reference to FIG. 1, an insert body B, which can have a substantially cylindrical shape, if desired, is preferably provided adjacent the adaptor body A. The insert body can include a flat first or rear end 130, as well as a bulbous second or front end 132. A longitudinally extending bore 134 extends between the first and second ends. The bore 134 is provided with a threaded section 136 at its rear end which is adapted to engage the threaded outer periphery 18 of the adaptor body second section 16 in order to provide a securing means to fasten the adaptor body to the insert body.

The tube 124 preferably extends through the insert body bore 134 to the insert front end 132. The tube is advantageous in order to allow direct communication of the fluid flowing through the tube and the bores 36, 38, 40, 44 and 46 as well as 80, 82 and 84 with an associated sprue C positioned adjacent the insert body B. In this way, fluid does not flow into the molten thermoplastic flowing through the insert body bore 134 but rather it communicates with the molten thermoplastic only at the sprue C. This is advantageous in order to insure that the fluid flows directly into the middle of the molten thermoplastic material instead of diffusing therein.

The fluid which flows through the sprue C creates a fluid cavity 140 in a plastic body or part 142 which is formed in a mold space 144 that is created by cooperation of a pair of mold halves 146 and 148 of a mold body D. As can be seen from FIG. 1, the fluid cavity is formed in a thicker section of the plastic body 142. The tube 124 also ensures that, during the exhaust of the fluid from a fluid cavity 140 created in the plastic body 142, there will not be molten thermoplastic flowing out with the gas.

In order to ensure that the fluid or gas flowing through the adaptor body and the insert body B is heated, suitable heater bands 152 and 154 can preferably encircle the adaptor body A and the insert body B. Alternatively, another way of heating the adaptor body A and insert body B would be by use of one or more heater cartridges (not illustrated) which could extend into one or more suitably configured bores (not illustrated) provided in the adaptor body and the insert body.

It is advantageous to provide hot gas to the plastic material which is being formed into the plastic part 142 because the heating of the gas where it enters the plastic keeps the plastic hot. Molten thermoplastic when it is cooled from the center, i.e., by cool gas entering the gas cavity 140 formed in the molten thermoplastic will under some circumstances deteriorate the properties of some plastics. These plastics particularly include crystalline plastic materials such as nylon, polyphenylene sulfide and polyester.

Generally, the mold is adapted to cool from the outside in and not from the inside out. Therefore the center of the plastic flow is meant to be hotter than the outside. If, on the other hand, a cool fluid is introduced into the center of the molten thermoplastic material, i.e., such as a gas which has not been heated, then the center of the molten thermoplastic cools which will deteriorate the properties of some plastics. While the gas temperature is generally always cooler than the melt temperature of the plastic (i.e., the melt temperature may be on the order of 600° F. and the heated gas temperatures on the order of 350° F.) if the gas were not heated at all (and would be at the ambient temperature of 50°-80° F.) then the properties of certain thermoplastic materials will be deteriorated.

Extending longitudinally through the insert body B is a second bore 160. An aperture 162 extends into the adaptor from the front end 132 thereof. The locations of the bore 160 and the aperture 162 can vary as necessary. In the embodiment of FIG. 2, there are two such apertures 162 and four such bores 160. It should be recognized, however, that any other suitable number of such apertures and bores may be provided as necessary.

Secured to the insert body B is a layer of a suitable conventional insulating material 164 such as mica. It is advantageous to insulate the bushing from the sprue C and hence the rest of the mold body, in order to allow the mold body to fully cool down. This is done by insulating the molten thermoplastic in the heated nozzle (not illustrated) the adaptor body A and the insert body B from the sprue C and the rest of the mold body. Thus, the thermoplastic in the mold body and sprue can cool down while the thermoplastic in the nozzle and the bushing (i.e., the adaptor A in the insert B) stays molten.

In some instances, it may be desirable to eliminate the layer of insulation material 164 so that the sprue C is kept hot along with the material being injected into the mold cavity 144. This may be advantageous when materials of different thermal conductivities are utilized for the sprue bushing A and insert body B on the one hand and the sprue C on the other hand. For example, a copper beryllium compound can be utilized for the sprue C, whereas a different material can be utilized for the sprue bushing A and adaptor B. In this way, heat can extend beyond the adaptor B to the sprue bushing rear portion thereby allowing the sprue to attach easily and reduce material thermal shock.

A bore 166 extends through the insulation material 164 in a manner so as to communicate with the bore 134 of the insert body B thereby allowing molten thermoplastic material to flow therethrough. Also provided in the insulation material is a first aperture 168 for accommodating a fastener 170 that secures the layer of insulation material to the insert body B by extending into and being fastened in the aperture 162 of the insert body. Further extending through the insulation material 164 is a second aperture 172 for accommodating a fastener 174 which secures the insert body B to the sprue C by extending into an aperture 176 of a sprue body 178. Extending longitudinally through the sprue body 178 is a bore 180 Which communicates with the insert body bore 134 and hence the adaptor body longitudinal bore 22. The bores 22, 134 and 180 are coaxial so that molten thermoplastic material can, as illustrated, flow entirely through them in a relatively easy fashion. In the meanwhile, gas will enter the sprue bore 180 directly at the front of the bore through the tube 122 as shown and will not be mixed with the molten thermoplastic material flowing through the insert body bore 134, as mentioned previously.

The method of utilizing the apparatus heretofore described is as follows. An amount of a molten thermoplastic sufficient for the preparation of the injection molded product in the mold cavity 144 (but less than the volume of the mold cavity) is prepared and the plastic material is introduced through the bores 22, 32, 134 into the sprue bore 180 from whence it flows into the mold cavity 144. Either simultaneously therewith or thereafter, a quantity of heated fluid, such as the neutral gas nitrogen, is introduced into the molten thermoplastic. In other words, the gas and plastic can be utilized in a simultaneous injection molding process or the so-called post injection molding process in which the gas is introduced only after the thermoplastic has already flowed into the mold cavity 144.

The heated gas proceeds to form the gas cavity 140 in the molten thermoplastic material. The gas can be introduced through both the lines 60 and 88 if desired so that gas flows simultaneously through both of these lines and thus through both ends of bore 38 through bore 36 and the bore 126 in the tube 124 to the front of the insert body B and thence into the sprue C. Alternatively gas inflow may take place only through line 60 or line 88 if desired.

Thereafter, once the fluid cavity has been formed in the plastic material 142 and when it is time to cool the molded product, the heated gas can be vented from the gas cavity. Such venting may take place through the lines 36, 38 and through both lines 60 and 88 if desired, or only through one of them such as the line opposite the gas inflow line. In other words, gas can flow in through line 60 and out through line 88 if desired. The gas will flow through the filters 80 thereby trapping any plastic particles.

It is advantageous to have both gas lines 60 and 88 allow flow in and out so as to ensure that the lines 40 and 80 will not plug due to the deposition of particles of thermoplastic material onto the filters 50. In other words, as gas enters through the filters 50, the gas will blow the thermoplastic particles back into the mold cavity and thereby clean the various gas flow channels in the sprue bushing A.

The heated gas is preferably at a pressure which is higher than the injection pressure at which the molten thermoplastic is introduced into the mold cavity. In this regard, the injection pressure, or booster pressure, can be at a pressure which is on the order of 2,000 p.s.i. On the other hand, the heated gas pressure, or packing pressure, or fill pressure, can be on the order of 2,500 p.s.i. Or perhaps even as high as 3,500 to 4,000 p.s.i. if required.

The pressure of the molten thermoplastic material as it flows into the sprue bushing orifice 22 may be higher due to the volume ratio of the flow channels involved. However, the pressure required to penetrate the molten thermoplastic may not be as great. Accordingly, a gas injection pressure of approximately 2500 p.s.i. may be adequate for the gas to penetrate the molten thermoplastic and flow into the center of the melt.

After the heated gas is vented, a cooling gas can thereupon be introduced into the gas cavity 140. The cooling gas can flow in through lines 66, 46, 44, 40, 38 and 36 as well as lines 94, 84, 82, 80, 38 and 36 if desired. In other words, the cooling gas can flow through both of the lines 66 and 94 if desired. Alternatively, cooling gas can flow in through line 66 and out through line 94 if so desired.

If desired, the body 142 can be cooled in such a fashion that a charge of cooling gas flows in through lines 66 and 94 and is held in the gas cavity 140 because valves 70 and 100 are closed. The gas will pick up a certain amount of heat from the interior of the plastic material 142. Thereupon, the valves 70 and 100 are opened so that the now heated gas can be exhausted. Thereafter, another charge of cool gas can enter through lines 66 and 94 and be held in the gas cavity 140 with the valves 70 and 100 being shut off. Subsequently, the valves 70 and 100 can again be opened in order to exhaust the now heated cooling gas (which has now picked up heat from the plastic part 142, thereby cooling the part) from the gas cavity 140. By this means, the body 142 can be readily cooled from the inside at the same time that the mold body halves 146 and 148 cool from the outside.

Once the part 142 has been cooled, the injection molded product is removed from the mold cavity 144.

If desired, the cooling gas can be held at a pressure which is higher than the pressure at which the heated gas is injected into the mold cavity. This would be advantageous to insure that the plastic stays against the mold cavity walls instead of shrinking away therefrom. Alternatively, the cooling gas can be at the same or a lower pressure than the heated gas. It is at this point envisioned that the cooling gas will be at a pressure higher than the 2,500–4,000 p.s.i. pressure of the heated gas although it could be at a lower pressure, such as a holding pressure of, e.g., 700–800 p.s.i. if desired.

Figure 4:
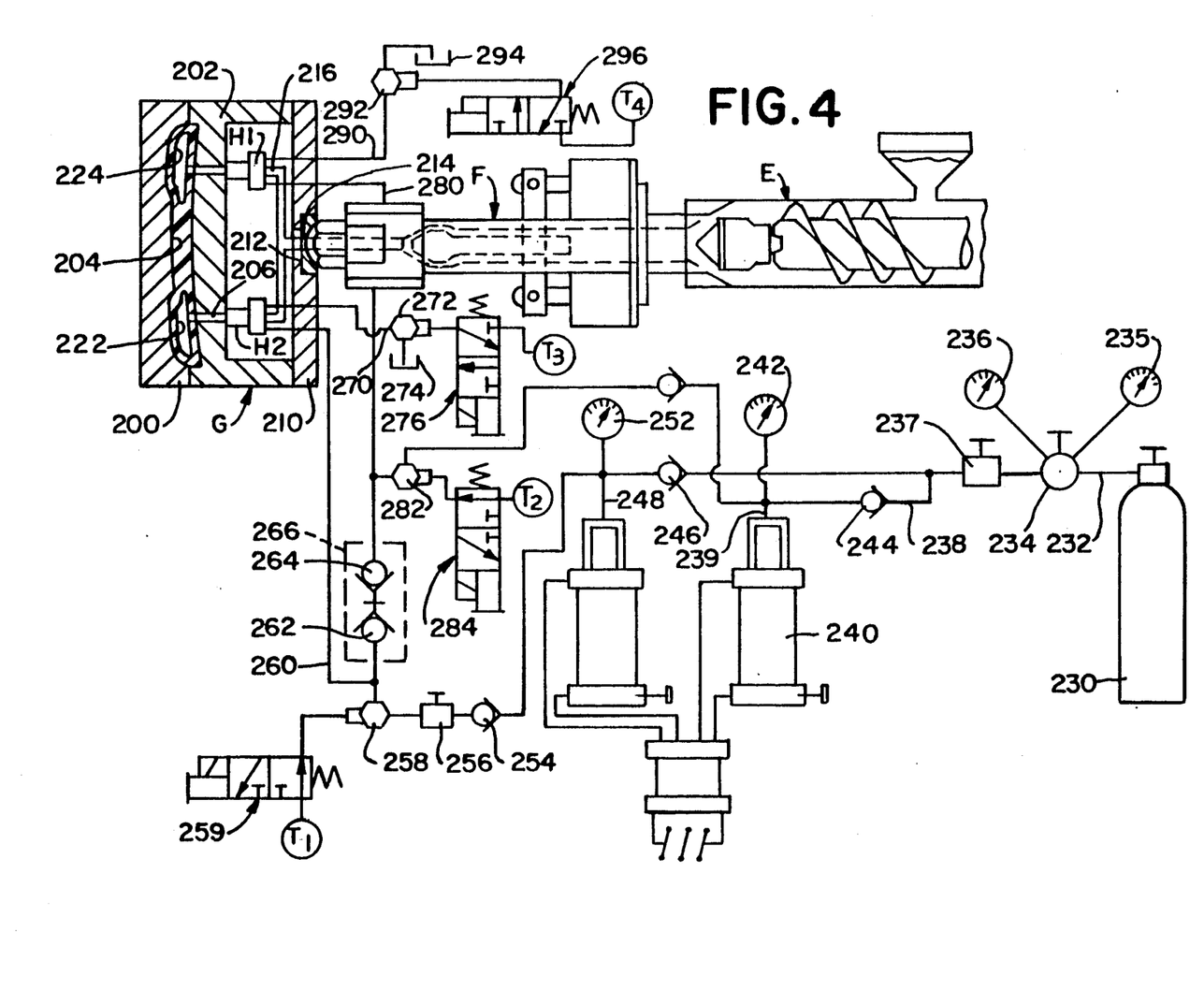
FIG. 4 is a schematic side elevational view of the apparatus utilized for a process for fluid assisted injection molding according to a second preferred embodiment of the present invention.
Figure 5:
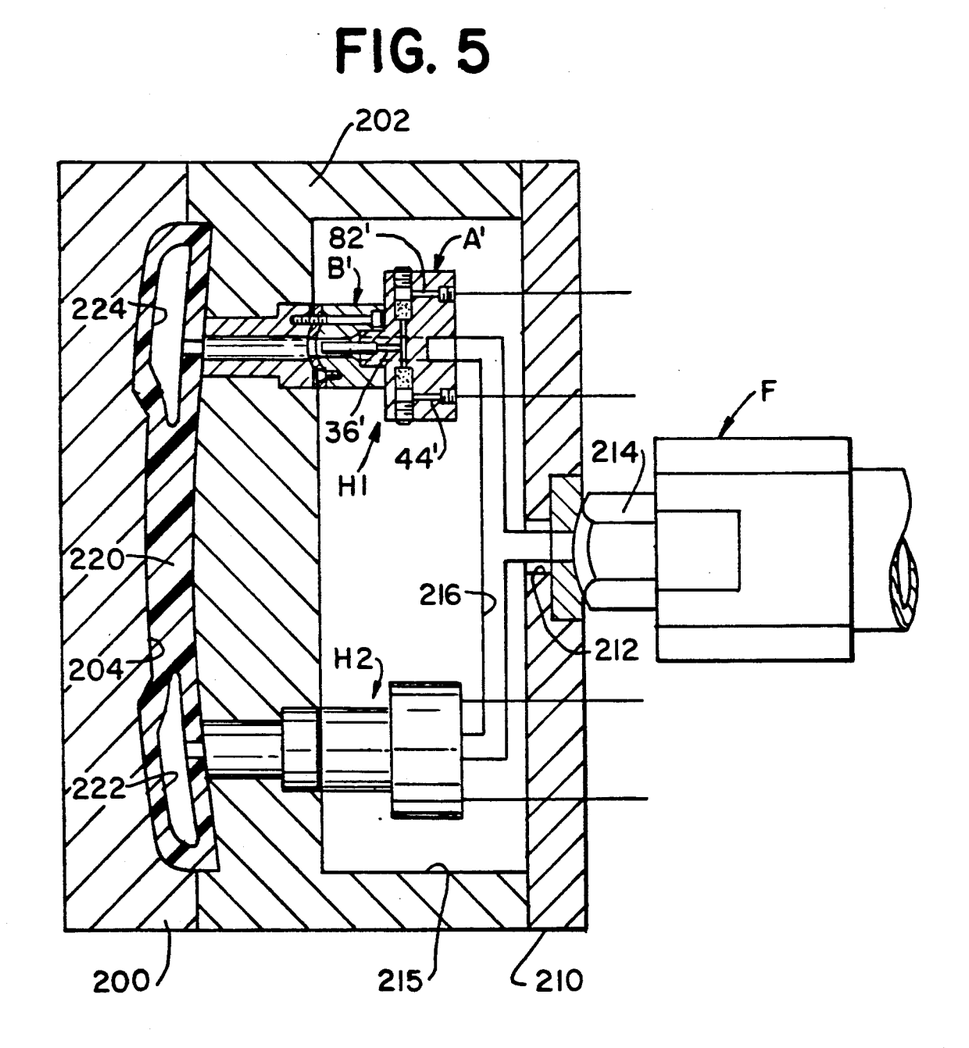
FIG. 5 is an enlarged view of a section of FIG. 4.

With reference now to FIGS. 4 and 5, the use of the sprue bushing in a different type of mold system according to a second preferred embodiment of the invention is there illustrated. For ease of illustration and appreciation of this embodiment, like components will be identified by like numerals with a primed (') suffix and new components will be identified by new numerals.

In this embodiment, a thermoplastic material injection machine or plasticizer E is illustrated together with a suitable associated nozzle F. The nozzle F delivers molten thermoplastic material to a mold body G which is defined by a base member 200 and a cover member 202. As best shown in FIG. 5, defined between the base and the cover is a mold cavity 204. Extending through the cover 202 is a suitable sprue 206. Holding the base 200 and cover 202 together is a suitable clamping plate 210. The clamping plate has a central bore 212 extending therethrough. An outer periphery of the plate 210 is so-shaped as to be able to cooperate with a profiled tip portion 214 of the injection nozzle F. Located in a space 215 defined between the cover 202 and the clamping plate 210, are a pair of hot runner channels 216 which feed the molten thermoplastic material to a sprue bushing H1 which can include an adaptor A' and an insert B'. A second, spaced, sprue bushing H2, which can have an identical construction, is also located in the mold body G. Also flowing through the two sprue bushings H1 and H2 is a relatively non-viscous fluid, such as a gas. As in the embodiment of FIG. 1, the molten thermoplastic forms a body 220 in the mold cavity 204 and the gas forms separate unconnected first and second gas cavities 222 and 224 in the thermoplastic material. It is noted that unlike the adaptor A of FIG. 1, the adaptor A' in FIG. 5 only has one gas inflow path utilizing channel 44' and one gas outflow path employing channel 82'. The other two paths in the adaptor A' are closed off.

With reference now again to FIG. 4, gas is provided from as gas reservoir 230 through a first line 232 and past a pressure reducing valve or first valve 234. At that point, two pressure gauges 235 and 236 are provided to measure the pressure of the incoming gas before and after the pressure reducing valve, respectively. The gas encounters a first manual control valve 237 which leads to a branch 238 which leads through a second branch 239 to a first pump 240 for pumping up the gas to a higher pressure which is indicated on a third pressure gauge 242. A first check valve 244 prevents the now-pressurized gas from flowing back downstream to the valve 234. Located in the first line 232 and downstream from the first branch 238 is a second check valve 246. Downstream therefrom, is a third branch line 248 which leads to a second pump 250. A fourth pressure gauge 252 indicates the pressure at which the second pump 250 pressurizes the gas. Provided downstream from the third branch 248 is a third check valve 254 and, downstream therefrom is a second manual control valve 256. A first remotely actuated fluid operated valve 258 is provided in the line 232. Supplying fluid from reservoir T1 to control the valve 258 is a solenoid actuated valve 259. Branching away from the first line 232 is a first inlet line 260 which leads gas to the sprue bushing H2.

Provided downstream from the first inlet line 260 are fourth and fifth check valves 262 and 264 which prevent a flow of the gas in either direction through the line at that point. These check valves can be manually opened and they can be housed in a common housing 266.

A first outlet line 270 leads the gas away from the sprue bushing H2. Provided in the first outlet line 270 is a second remotely actuated control valve 272 selectively allows the flow of gas to a suitable sump 274. The valve 274 is fluid operated and is controlled by a solenoid actuated valve 276 which selectively supplies fluid from reservoir T3 to actuate the valve 272.

In order to provide gas to the sprue bushing H1, a second inlet line 280 communicates with the first branch 238 in order to allow pressurized gas to be sent through the second inlet line 280 to the adaptor body A' and then into the second gas cavity 224 in the body 220. Controlling the flow of gas through the first branch 238 is a third remotely actuated control valve 282. As with the other two control valves 258 and 272, the third control valve 282 is a fluid actuated valve. Pressurized fluid is selectively provided to actuate the valve 282 by a solenoid operated valve 284 from a reservoir T2. Allowing a venting from the second gas cavity 224 is a second outlet line 290 which is in communication with the sprue bushing H2. Provided in the line 290 is a remotely controlled fluid actuated control valve 292 which selectively allows outlet gas to flow to a sump 294. Controlling the actuation of the valve 292 is a solenoid actuated valve 296 which selectively allows pressurized fluid to flow from reservoir T4 to the valve 292.

Figures 6, 7:
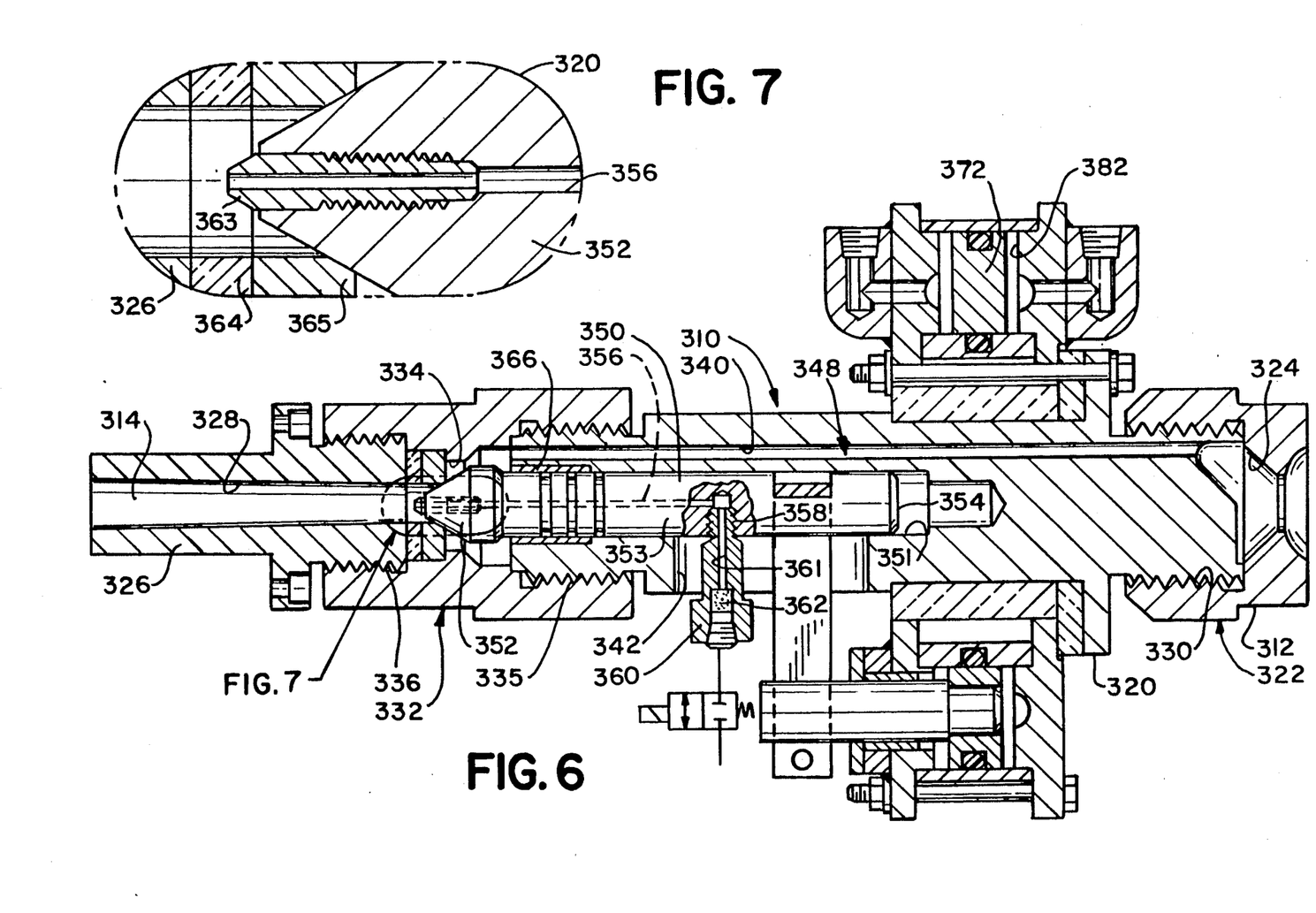

Instead of providing a sprue bushing as shown in FIG. 5 for the bodies H1 and H2, an injection nozzle according to FIG. 6 can be utilized instead. This type of injection nozzle comprises a nozzle body 310 having an inlet end 312 in a discharge end 314. The nozzle includes a housing which comprises a central section 320, an adaptor or rear section 322 having a longitudinal bore 324 extending therethrough and a tip or front section 326 having a longitudinally extending bore 328 therethrough. The adaptor 322 is suitably secured to the central section 320 by interengaging threads as at 330. Securing the tip member 332 which has a central longitudinally extending bore 334 therethrough with the bore having a pair of spaced threaded areas 335 and 336 which respectively cooperate with threaded exterior peripheries provided on the tip 326 and a front end of the central section 320. The central section 320 has a first aperture 340 extending longitudinally therethrough in an orientation which is coaxial with the bores 324 and 328 in the adaptor and the tip respectively. There are preferably two such apertures 340 which can be kidney shaped if desired. Thus, a flow channel is formed entirely through the nozzle. A second aperture 342 extends through opposing side walls of the central section 320 in a direction normal to the first apertures 340 and not in communication therewith.

A valve body 348 is adapted to reciprocate in the nozzle body 310. For this purpose, a needle 350 of the valve body is reciprocally mounted in a third aperture or bore 351 extending longitudinally in the central section 320 and parallel with the first apertures 340. The needle has a tapered first end 352, a cylindrical central portion 353 and a flat second end 354. A longitudinal aperture 356 extends from the first end into the valve needle 350 until it meets a second aperture 358 which extends normal to the first aperture inwardly from the exterior periphery of the needle 350. The second aperture is suitably threaded so that it can receive an externally threaded fitting 360. Extending longitudinally through the fitting is a bore 361 that communicates with the longitudinal aperture 356 of the needle 350. In this way, a suitable gas or other relatively non-viscous fluid such as steam can be transmitted through the fitting 360 into the needle 350 so that it can flow out the free end of the needle 350 and into the bore 328 in the tip 326. From there, the gas will flow into the gas cavities 222 and 224 as shown in FIG. 4. A filter 362 is preferably located in the bore in order to filter the gas flowing therethrough.

With reference now also to FIG. 7, preferably secured to the needle first end 352 is a tube 363 which has a forward end thereof extending past the needle first end. The tube 363 is in fluid communication with the relatively non-viscous fluid flow aperture 356 extending through the needle 350. A layer of insulation 364 is preferably disposed between the nozzle body central section 320 and the tip 326.

The insulation 364 is useful in order to restrict heat transfer from the nozzle to the sprue bushing 326. The normal material for such insulation is mica which is relatively weak in impact strength. Accordingly, a spacer element 365 is preferably disposed between the insulation and the central section 320. The spacer can be made from a relatively hard material such as steel. Apertures are provided through the insulation 364 and spacer 365 which apertures are coaxial with the tip bore 328 and the coupler bore 334.

Encircling a forward portion of the needle 350 is preferably a weir bushing 366 which can be made from a relatively hard material, such as carbide.

As shown, the nozzle preferably further comprises a means for selectively urging the valve body 348 in a first direction so as to close the nozzle body discharge end 314 by abutting a side face of the needle front end 352 against an angled portion of the spacer element through which the tip bore extends.

With reference again to FIG. 6, the means for selectively urging can be secured to the nozzle body central section 320 and preferably can comprise a torroidally shaped piston 372 which reciprocates in a chamber 382 formed by elements of a housing that are secured to the body central section 320. A suitable gas can be fed to either side of the piston 372 in order to reciprocate same. This then will reciprocate the needle 350 held in the nozzle 320.

In this embodiment, the gas will enter the fitting 360 and flow through the bore 361 and into the longitudinal aperture 356 of the needle 350. The gas will then flow through the bore 328 and into one of the spaced gas cavities 222 or 224. As with the embodiment described hereinabove, two of these nozzles 310 are required, one at the location marked by the identifying numeral H1 and the other one located at H2. The flow of gas through the nozzles is as described hereinabove, except that a common flow line for gas flow in and gas flow out is utilized. In other words, the lines 260 and 270 are merged or joined at the fitting 360 into a single line. However, upstream from the fitting 360, the lines separate out and flow through them is controlled by the remotely actuated fluid operated valves 258 and 272 respectively. However, separate flow lines could also be employed if desired. For example, two such fittings 360 could be provided for the valve 350 so that both fittings communicate with the bore 356, in much the same way as the common line 36 in FIG. 1 communicates gas from separate gas lines 44 and 82.

Also, in this embodiment, a separate plastic injection molding nozzle, such as F in FIG. 4, is not required. Just the injection machine E is necessary since the nozzle function is provided by the nozzle body 310.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. A process for producing an injection molded product, comprising:
   introducing an amount of molten thermoplastic sufficient for the preparation of the injection molded product into a mold cavity;
   introducing a quantity of a heated fluid, through a first path, into the molten thermoplastic in the mold cavity thereby forming a fluid cavity in the molten thermoplastic;
   forming an injection molded product;
   venting the heated fluid from the fluid cavity through said first path;
   introducing a cooling fluid into the fluid cavity through said first path;
   cooling the injection molded product; and,
   venting the cooling fluid from the fluid cavity through said first path.

2. The process of claim 1 further comprising the step of removing the injection molded product from the mold cavity.

3. The process of claim 1 wherein said step of introducing a quantity of a heated fluid takes place during said step of introducing an amount of molten thermoplastic.

4. The process of claim 1 wherein said step of introducing a quantity of a heated fluid takes place after said step of introducing an amount of molten thermoplastic.

5. The process of claim 1 further comprising the steps of:
   pressurizing the cooling fluid before said step of introducing the cooling fluid; and,
   stopping a flow of the cooling fluid after said step of introducing the cooling fluid.

6. The process of claim 1 further comprising the step of repeating said steps of introducing a cooling fluid and venting the cooling fluid until the injection molded product is near room temperature.

7. The process of claim 1 wherein said heated fluid is pressurized to a first pressure and wherein said cooling fluid is pressurized to a second pressure which is at least as large as said first pressure.

8. The process of claim 1 further comprising the step of filtering said heated fluid during said step of venting said heated fluid.

9. A process for producing an injection molded product, comprising:
   introducing a molten stream of a thermoplastic material at a first, injection, pressure into a mold cavity having walls;
   introducing a heated gas at a second pressure, which is at least as high as the first pressure, into the molten stream of thermoplastic material thereby forming a gas cavity in the thermoplastic material;
   venting the heated gas from the gas cavity;
   urging the thermoplastic material against the walls of the mold cavity by introducing a cooling gas, held at a third pressure which is higher than said second pressure, into the gas cavity;
   cooling the thermoplastic material to form an injection molded product; and,
   venting the cooling gas from the gas cavity.

10. The process of claim 9 further comprising the step of removing the injection molded product from the mold cavity.

11. The process of claim 9 wherein said step of introducing a quantity of a heated gas takes place during said step of introducing an amount of molten thermoplastic.

12. The process of claim 9 wherein said step of introducing a quantity of a heated gas takes place after said step of introducing an amount of molten thermoplastic.

13. The process of claim 9 further comprising the steps of repeating said steps of introducing a cooling gas and venting the cooling gas until the injection molded product is near room temperature.

14. The process of claim 9 further comprising the step of filtering the heated gas during said step of venting the heated gas.

15. The process of claim 9 further comprising the step of filtering the cooling gas during said step of venting the cooling gas.

16. A process for fluid assisted injection molding for producing an injection molded product, the process comprising:
   introducing a molten stream of a thermoplastic material into a mold cavity;
   introducing a heated gas held at an above atmospheric pressure, into the molten stream of thermoplastic material through a first path;
   forming a gas cavity in the thermoplastic material;
   forming an injection molded product;
   venting the heated gas from the gas cavity;
   introducing a cooling gas held at an above atmospheric pressure into the gas cavity through a second path spaced from the first path;
   cooling the injection molded product; and,
   removing the injection molded product from the mold cavity.

17. The process of claim 16 wherein said step of introducing a quantity of a heated gas takes place after said step of introducing an amount of molten thermoplastic.

18. The process of claim 16 further comprising the steps of:
   holding the cooling gas after said step of introducing a cooling gas while said step of cooling the injection molded product takes place;
   subsequently venting said cooling gas and repeating said step of introducing a cooling gas; and,
   holding the cooling gas until the injection molded product is near room temperature.

19. The process of claim 16 further comprising the steps of venting the heated gas and the cooling gas, respectively, through said first and second flow paths.

20. The process of claim 16 further comprising the step of filtering the heated gas during said step of venting the heated gas.

21. A process for producing an injection molded product, comprising:
   introducing an amount of molten thermoplastic sufficient for the preparation of the injection molded product into a mold cavity through a body having a longitudinally extending first flow path for the thermoplastic;
   introducing a quantity of a heated fluid through a pair of spaced second fluid passages in the body which pair of fluid passages each communicate with and terminate in a third passage that extends longitudinally in the body until said third passage terminates in a port of a periphery of the body, the fluid being introduced through said port into the molten thermoplastic as it flows into the mold cavity thereby forming a fluid cavity in the molten thermoplastic;
   forming an injection molded product;
   venting the heated fluid from the fluid cavity back through said second and third passages of said body; and,
   cooling the injection molded product.

22. The process of claim 21 wherein said step of cooling comprises the subsidiary steps of:
   introducing a cooling fluid through said second and third passages into the fluid cavity; and,
   venting the cooling fluid from the fluid cavity through said second and third passages.

23. The process of claim 22 further comprising the step of repeating said steps of introducing a cooling fluid and venting the cooling fluid until the injection molded product is near ambient temperature.

* * * * *